Aug. 22, 1950 W. VUTZ 2,520,107
RELEASE MECHANISM FOR MOWERS
Original Filed May 26, 1943 3 Sheets-Sheet 1

INVENTOR.
Wilhelm Vutz
BY
Alden D. Redfield
ATTORNEY

Aug. 22, 1950   W. VUTZ   2,520,107
RELEASE MECHANISM FOR MOWERS
Original Filed May 26, 1943   3 Sheets-Sheet 2
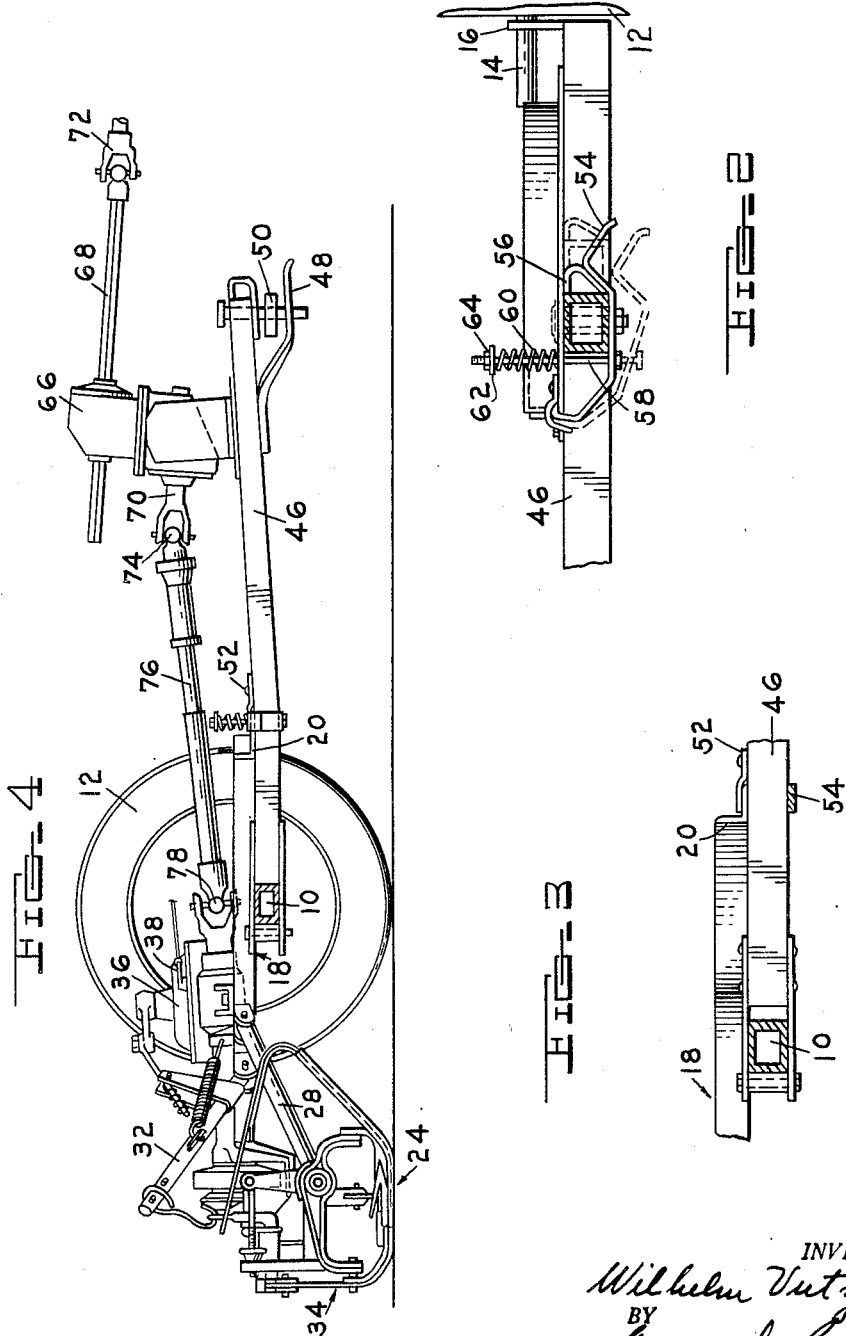

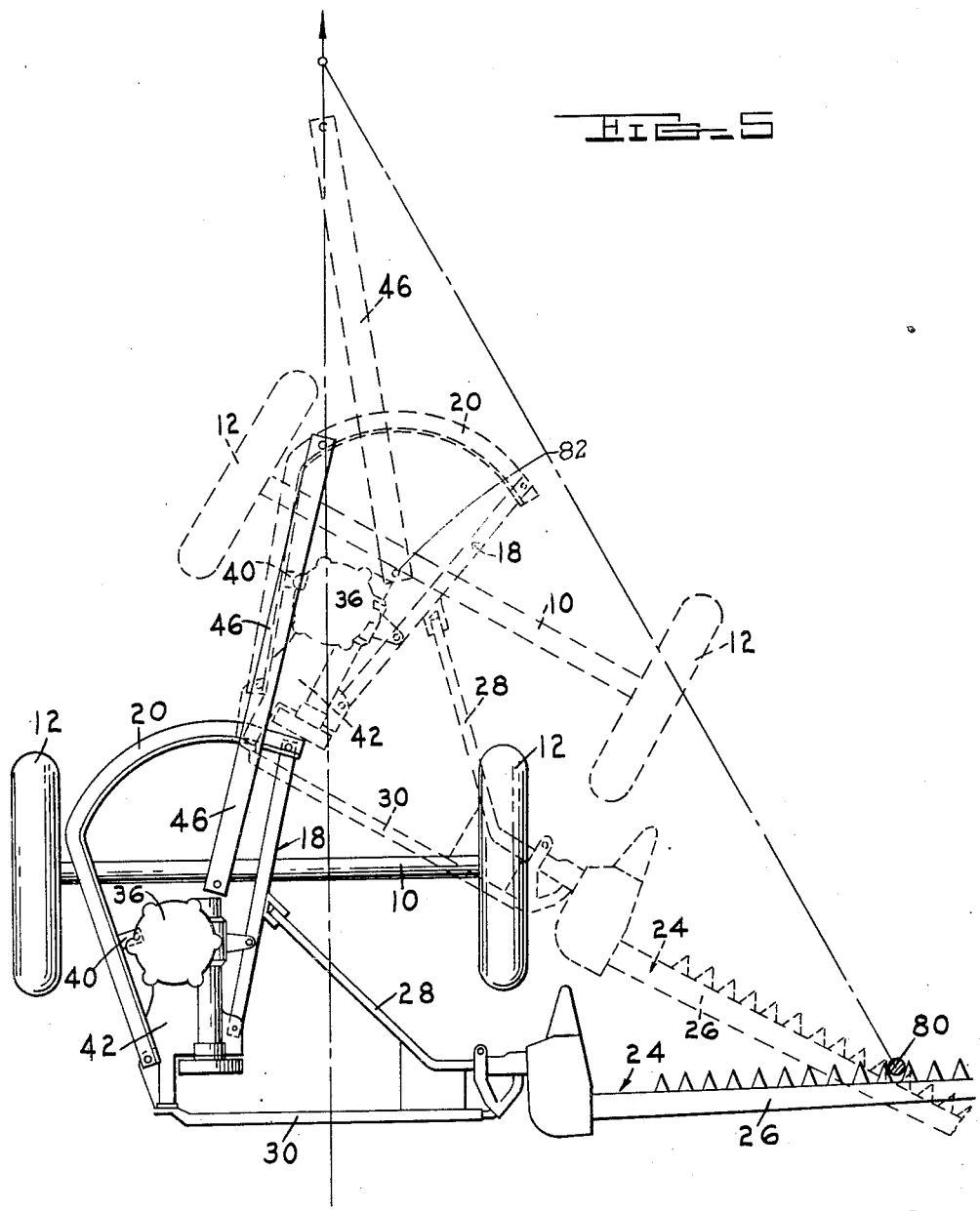

Patented Aug. 22, 1950

2,520,107

UNITED STATES PATENT OFFICE 2,520,107

RELEASE MECHANISM FOR MOWERS

Wilhelm Vutz, Coldwater, Ohio, assignor to Avco Manufacturing Corporation, Cincinnati, Ohio, a corporation of Delaware Original application May 26, 1943, Serial No. 488,482. Divided and this application April 24, 1948, Serial No. 22,967

4 Claims. (Cl. 56—25)

This invention relates to mowing machines, and more particularly to mowers of the trailer type adapted for use with conventional farm or industrial tractors.

This is a division of the joint application, Serial Number 488,482, filed by Adolph J. Synck and Wilhelm Vutz on May 26, 1943, now Patent 2,463,726, issued March 8, 1949.

The present invention is concerned primarily with a mower structure in which the cutting mechanism is held in a laterally extended operative position by a releasable latch means, and is swingable about a vertical axis to a trailing position when an obstruction is encountered by the cutting elements. In this type of structure, the latch automatically operates to release the cutting mechanism for limited movement about the obstruction so as to prevent damage to the cutting elements before the forward movement of the tractor is arrested.

The effectiveness of the latch mechanism in protecting the cutting elements, however, is dependent upon the manner in which this limited movement is provided for in the mower structure. Release mechanisms heretofore incorporated on mower structures have not provided for actual rotation of the ground engaging wheels as the mower moves about an obstruction but have merely released the mechanism so as to permit the wheels to slide laterally in a circular path about the obstruction.

It is apparent, therefore, that the additional pulling effort required to produce this wheel slide in the conventional type of mower over that which would be required to move the mower wheels in a direction substantially normal to their axis of rotation, would produce a corresponding increase of the local stresses set up within those cutting elements in direct contact with the obstruction.

It is accordingly the principal object of this invention to provide an improved mower structure having a release mechanism effective to permit the mower to move easily about an obstruction without overstressing the cutting elements.

Another object of the invention is to provide an extremely reliable and fast operating release mechanism suitable for use on tractor drawn mowers.

A further object of the invention is to produce a mowing machine having a cutter release mechanism, which may be conveniently relatched after an obstruction has been encountered, by the simple expedient of reversing the direction of travel.

Another object of the invention is the provision of a stable mower structure able to withstand the side draft produced by operation of the cutting mechanism under a heavy load.

Other objects and advantages of the invention will appear from a consideration of the following detailed description composed with reference to the drawing that constitutes a part of this specification and in which:

Fig. 2 is a vertical section view taken substantially on line 2—2 in Fig. 1.

Fig. 3 is a vertical section view taken substantially on line 3—3 in Fig. 1.

Fig. 4 is a side elevation view of the mowing machine in Fig. 1, with one of the ground wheels, and a portion of the axle removed.

Fig. 5 is a diagrammatical plan view illustrating movements of the various mower elements upon a disengagement of the release mechanism.

Figure 1:
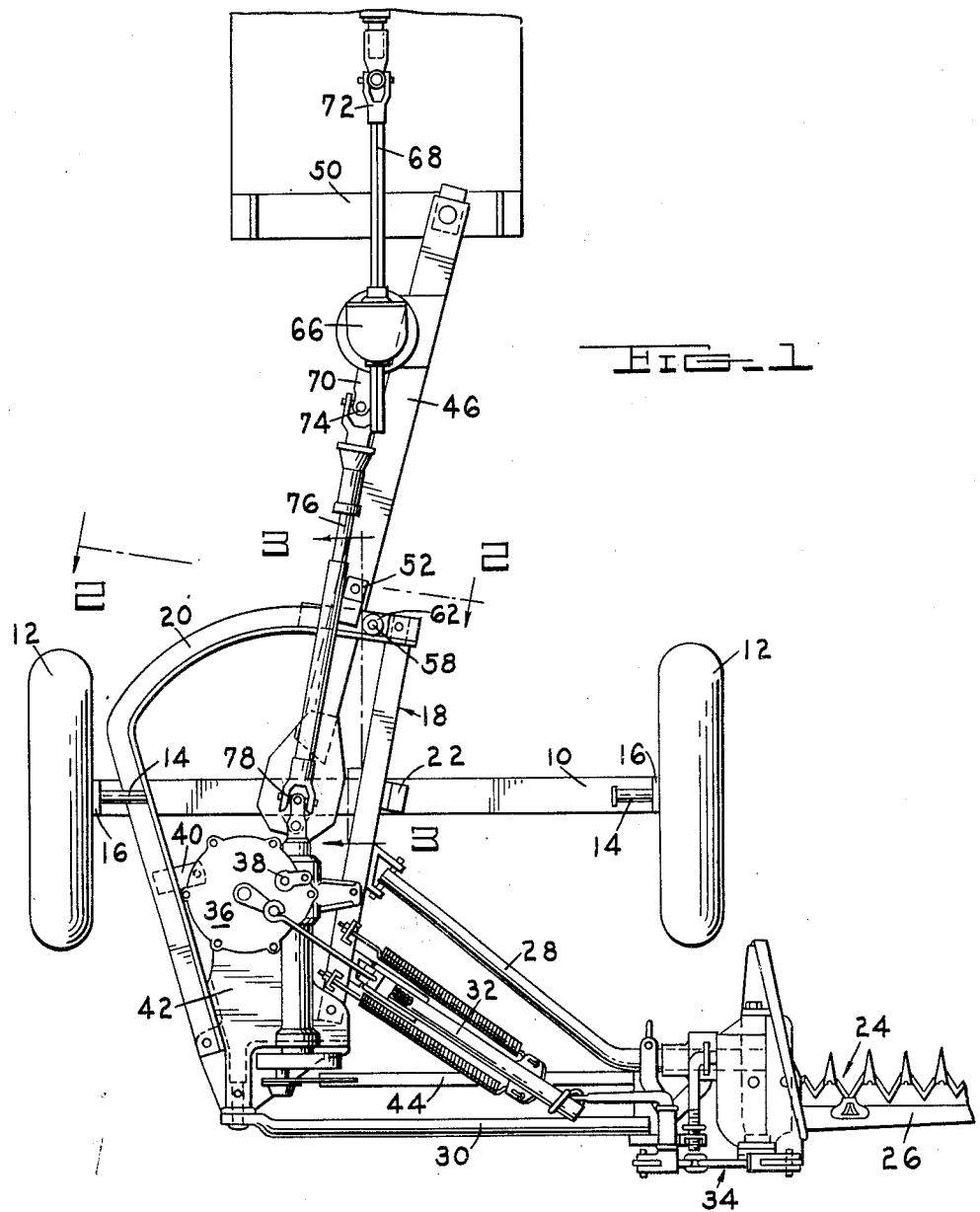
Fig. 1 is a plan view of a mowing machine embodying the present invention shown connected to the power take off and draw bar of a conventional tractor not completely shown.

Referring to the drawings for a more detailed discussion of the invention, 10 designates an axle supported for movement on ground engaging wheels 12 mounted for rotation on spindles 14 secured to either end of the axle 10 by brackets 16.

A triangular frame 18, including an angle member having an arcuate forward portion 20, is mounted on the axle 10 by suitable means such as a bracket 22. A standard cutting mechanism 24, including a cutter bar assembly 26, is supported laterally rearward of the axle 10 by means including brace rods 28 and 30 pivotally secured to the frame 18.

A conventional elevating system is provided for the cutting mechanism 24, comprising an elevator bar 32, connected at one end of appropriate linkage 34 to the cutter bar assembly 24, and adapted at the other end for actuation by a transmission 36 having a remote control lever 38. The transmission 36 is mounted on the frame 18 by means including brackets 40 and 42, and adapted to drive the cutting mechanism through a conventional pitman bar 44.

A draft tongue 46 is pivoted on the axle 10 and provided on the forward end with a hitch 48 adapted to fit around the draw bar 50 of a tractor not fully shown. That portion of the tongue 46 adjacent the arcuate frame member 20, has an offset supporting and guide plate 52 fixedly secured thereto and adapted to overlie the lateral portion of the arcuate frame member 20. The tongue 46 is held in a fixed position, relative to the frame 18, by means of a releasable hitch comprising a substantially ogee shaped latch 54 carried by the arcuate frame member 20 for cooperation with a cam member 56 fixed on the tongue 46. The latch 54 is pivoted on one end to the arcuate frame member 20, and held in yielding engagement with the cam 56 by resilient means, comprising a bolt 58 extended through both the latch 54 and the frame member 20 and loaded on the upper end with a coil spring 60 held in compressing engagement with the lateral portion of the arcuate member 20 by means of a retaining washer 62 and nut 64.

A gear box 66 having a driven shaft 68 and a driving shaft 70 is mounted on the tongue 46. The driven shaft 68 is provided on the forward end with a universal joint 72 suitable for connection to the power take off shaft of a draft tractor not shown. The driving shaft 70 of the gear box 66 is connected, through a universal joint 74, to a telescopic shaft 76 which is adapted to drive the transmission 36 through an articulated joint 78.

This completes the descriptive portion of the specification relating to the mower structure; however, to better understand the invention, a discussion is now directed to the manner in which the device operates so as to achieve the desired objectives.

In practice, when an obstruction 80 is encountered by the mower cutter bar 26, any forward movement of the tractor causes a lateral force to be transmitted from the cutting mechanism through the rods 28 and 30 to the frame 18. This force tends to rotate the frame 18 in a clockwise direction, thereby causing the cam 56 to exert a downward component of force upon the spring loaded latch member 54.

When this downward component of force reaches a predetermined magnitude, the latch member will assume an extended position, as illustrated by the dotted lines in Fig. 2, and release the cam 56. This renders the frame and its associated structure free for lateral movement relative to the tongue. Accordingly, the frame 18 and all members fixed thereto, move in a circular path about the obstruction, as indicated by the broken lines in Fig. 5, until the pivotal connection between the tongue 46 and the axle 10 falls at a point 82 on an imaginary straight line between the locking pin in the tractor draw bar 50 and the obstruction 80.

This represents the fully extended position of the mower and should provide ample space within which to arrest the forward movement of the tractor in event the cutting elements cannot roll completely free of the obstruction 80. When the obstruction has been passed, the operator can re-engage the latch mechanism by the simple expedient of reversing the tractor and rolling the mower mechanism back until the latch 54 is forced open to receive the cam 56 and thereby lock the tongue 46 in the normal operating position.

While this invention has been described with reference to the details of a single embodiment, it will be appreciated by those skilled in the art that the principles involved are susceptible of numerous other applications.

What I claim, therefore, and desire to secure by Letters Patent is:

1. In combination in a tractor drawn mower, an axle, ground wheels on said axle, a framework rigidly secured to and extending fore and aft from said axle, a cutter mechanism operatively secured at the rear of said framework and having a cutter bar extending laterally from one side of said framework, a draft tongue pivotally secured to said axle on its side remote from the cutter bar, the forward portion of said framework defining an arc having a center coincident with the point of pivotal attachment of said tongue, a guide member secured to said tongue and slidably engaging the arcuate forward portion of said framework, and yieldable means releasably joining said tongue to the forward portion of said framework, said means releasing said tongue for free swinging movement when the cutter bar strikes an obstacle whereby the mower wheels about the obstacle as a center.

2. Apparatus as defined in claim 1 in which said yieldable means comprises a cam secured to said draft tongue and a spring loaded latch secured to the arcuate forward portion of said framework.

3. In combination in a mower of the type which is drawn as an independent unit behind a tractor or similar draft device, an axle, ground wheels rotatably secured to the axle, a draft tongue pivotally secured to said axle, a frame rigidly secured to said axle and extending fore and aft therefrom, the forward portion of said frame defining a circular arc having its center coincident with the point of pivotal attachment of said draft tongue on said axle, a guide member secured to said tongue for slidable engagement with the arcuate forward portion of said frame, a cutter bar mechanism operatively secured to said frame behind said axle, and a releasable latch joining said tongue to the forward portion of said frame whereby said tongue may be released for free swinging movement about its pivotal attachment to said frame when said cutter bar encounters an obstacle, the mower simultaneously wheeling about the obstacle as a center.

4. In combination in a mower of the type which is drawn as an independent unit behind a tractor or similar draft device, an axle, ground wheels rotatably secured to the axle, a draft tongue pivotally secured to said axle, a frame rigidly secured to said axle and extending fore and aft therefrom, the forward portion of said frame defining a circular arc having its center coincident with the point of pivotal attachment of said draft tongue on said axle, a guide member secured to said tongue for slidable engagement with said frame, a cutter bar mechanism operatively secured to said frame, and a releasable latch joining said tongue to the forward portion of said frame whereby said tongue may be released for free swinging movement about its pivotal attachment to said frame when said cutter bar encounters an obstacle, the mower simultaneously wheeling about the obstacle as a center.

WILHELM VUTZ.

REFERENCES CITED

The following references are of record in the file of this patent:

UNITED STATES PATENTS

| Number | Name | Date |
| --- | --- | --- |
| 1,887,352 | Huddle | Nov. 8, 1932 |
| 1,974,410 | Caughey | Sept. 25, 1934 |
| 2,198,910 | Everett | Apr. 30, 1940 |
| 2,275,259 | Johnson et al. | Mar. 3, 1942 |